(12) United States Patent
Kia et al.

(10) Patent No.: US 7,048,880 B2
(45) Date of Patent: May 23, 2006

(54) METHOD OF FORMING A COMPOSITE ARTICLE WITH A TEXTURED SURFACE

(75) Inventors: Hamid Ghavami Kia, Bloomfield Hills, MI (US); Peter Herbert Foss, Shelby Township, MI (US); John Neal Owens, Royal Oak, MI (US); Terrence James Wathen, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 695 days.

(21) Appl. No.: 10/202,445

(22) Filed: Jul. 24, 2002

(65) Prior Publication Data

US 2003/0030177 A1    Feb. 13, 2003

Related U.S. Application Data

(63) Continuation-in-part of application No. 09/587,393, filed on Jun. 5, 2000, now Pat. No. 6,699,419.

(51) Int. Cl.
*B29C 63/00* (2006.01)
*B29C 65/00* (2006.01)
*B28B 5/00* (2006.01)

(52) U.S. Cl. ............ 264/101; 264/241; 264/250; 264/255; 264/259; 264/263; 264/264; 264/269; 264/308; 264/330

(58) Field of Classification Search ............ 264/101, 264/241, 250, 255, 259, 263, 264, 269, 308, 264/330
See application file for complete search history.

(56) References Cited

U.S. PATENT DOCUMENTS

| | | | |
|---|---|---|---|
| 4,126,719 A | 11/1978 | Koyanagi et al. | 428/35 |
| 4,285,744 A | 8/1981 | Rudolf et al. | 156/59 |
| 4,308,224 A | 12/1981 | Becker | 264/25 |
| 4,367,110 A | 1/1983 | Yoshikawa | 156/219 |
| 4,518,722 A | 5/1985 | Schutt et al. | 523/135 |
| 4,959,250 A | 9/1990 | McKinnon | 428/15 |
| 5,001,000 A | 3/1991 | Rohrbacher et al. | 428/215 |
| 5,087,405 A | 2/1992 | Maker | 264/255 |
| 5,310,095 A | 5/1994 | Stern et al. | 222/402.1 |
| 5,344,692 A | 9/1994 | Schmoock | 428/161 |
| 5,688,851 A | 11/1997 | Kress | 524/430 |
| 5,782,289 A | 7/1998 | Mastrorio et al. | 164/516 |
| 5,916,643 A | 6/1999 | Spain et al. | 428/31 |
| 6,312,484 B1 | 11/2001 | Chou et al. | 51/298 |

FOREIGN PATENT DOCUMENTS

| | | |
|---|---|---|
| EP | 0 552 918 A1 | 7/1993 |
| FR | 2617755 | 1/1989 |
| JP | 59140020 | 8/1984 |
| JP | 61044625 | 3/1986 |

*Primary Examiner*—Stephen J. Lechert, Jr.
(74) *Attorney, Agent, or Firm*—Kathryn A. Marra

(57) ABSTRACT

A molding process for a composite article uses a textured film layer to shape the surface of the composite article. The film layer is placed in the mold with the textured film surface exposed and a composite material is placed over the textured film surface. Preferably, the film layer is vacuum-formed onto the mold to take the shape of the mold. As it cures, the composite article takes the shape of the textured film layer to form a textured article surface. After demolding, the film layer adheres to the article as a protective coating, but can be readily removed from the article to expose an underlying textured surface of the article.

29 Claims, 2 Drawing Sheets

METHOD OF FORMING A COMPOSITE ARTICLE WITH A TEXTURED SURFACE

CROSS-REFERENCED APPLICATION

This application is a continuation-in-part of commonly assigned U.S. Ser. No. 09/587,393 filed Jun. 5, 2000, now U.S. Pat. No. 6,699,419 entitled "Method of Forming a Composite Article with a Textured Surface", and co-pending with this application.

TECHNICAL FIELD

The present invention generally relates to a method for producing textured composite articles. More particularly, this invention relates to a method by which a textured surface is produced on a composite article through the use of a textured film layer that is applied to the mold in which the article is subsequently formed, and wherein the textured film layer may be retained on the article surface after the molding operation as a removable protective coating that when removed exposes the textured surface of the article.

BACKGROUND OF THE INVENTION

Open tool molding is a process for producing relatively low cost composite panels at low volumes. While steel molds are often used for other molding operations, the open tool molding process was developed to use less expensive one-sided epoxy or polyester molds to produce various products, such as recreational vehicle (RV) composite panels with an in-mold finish. In this process, the mold surface is cleaned and waxed, after which a layer of gel coat is applied and then partially cured. A laminate is then applied to the gel coat layer, and the laminate and gel coat are cured to form a unitary part having a surface that is defined by the cured gel coat. Molded parts can be produced by this method to have a class A finish bearing any desired color originally carried by the gel coat.

While the use of a low-cost epoxy or polyester mold offers significant cost advantages over other molding methods used to produce composite articles, there are certain limitations imposed by a polymeric mold. One such example is the molding of panels, such as automotive interior panels, for which a textured finish, such as a leather grain look, is desired. Most typically in the past, plastic textured panels have been made by either injection molding or compression molding using steel molds. A grained profile is formed on the surface of the steel mold during the tool making process. The grained surface profile is then transferred onto the surface of the molded parts, creating a textured surface finish. Because of the hardness of the steel molds, the grained surfaces maintain their appearance for many years of production. In contrast, polymeric molds do not have the same level of hardness and, therefore, a grained surface created on a polymeric mold wears out quickly. The vertical walls of a grained polymeric mold are particularly vulnerable to wear during demolding, with the result that an uneven surface finish is produced after molding only a few parts. Consequently, polymeric open tool molds have been generally limited to molding articles with smooth, glossy surfaces.

Alternatively, the composite articles can be given a textured finish by a molding process that uses an interfacial layer to isolate the surface of the mold from the surface of a composite article produced with the mold. According to that approach, a solution can be sprayed on the mold surface to form the interfacial layer, whose surface opposite the mold surface is textured. The texture of the interfacial layer is then transferred to the surface of the composite article produced with the mold. After demolding, the interfacial layer is removed from the article to expose an underlying textured surface of the article. While this approach works well, it requires an additional spraying step for the interfacial layer and the textured surface of the sprayed interfacial layer must also be closely controlled to produce a high quality surface finish on the article. In addition, curing time is required for the interfacial layer to become sufficiently stable prior to the composite layer being applied. Such an example can be found in commonly-assigned U.S. Ser. No. 09/587,393 filed Jun. 5, 2000, entitled "Method of Forming a Composite Article with a Textured Surface".

In view of the above, it would be desirable if a method were available for producing composite articles with a textured finish using a simplified approach that eliminates that need for the spraying and curing of an interfacial layer.

SUMMARY OF THE INVENTION

In one embodiment of the present invention, the method of molding a composite article with a textured surface generally entails providing a film layer having at least one textured surface, placing the film layer on the mold with the textured surface facing away from the mold surface, and applying a composite material over the textured film surface such that the composite material adjacent the textured film surface substantially conforms to the shape of the textured film surface to form a textured article surface. In accordance with an embodiment of the invention, the composite material is a gel coat material which is removed from the composite article after demolding to reveal a textured surface layer of the composite article.

In accordance with other aspects of the invention, the film layer is preferably vacuum formed onto the surface of the mold prior to application of the composite material over the film layer.

After the composite article is removed from the mold, the film layer can then be immediately removed from the composite article, or left on the article as a temporary protective coating during shipping and handling and then later removed prior to or after the article is installed or assembled with other components.

In view of the above, a significant advantage of this invention is that an open tool mold can be fabricated to have smooth mold surfaces, with the textured film layer being the sole means for producing a textured surface on an article produced with the mold. As a result, molds formed from lower cost and less durable materials, particularly polymers such as epoxies and polyesters, can be used to produce articles with textured surfaces, without quickly damaging or wearing out the mold surfaces. Also advantageously, this invention eliminates the need to spray and cure an additional layer of textured material in the mold to make the composite article. Also, the use of the separate film layer offers more flexibility and options in the styling of the textured film surface and thus the final textured article surface.

Other objects and advantages of this invention will be better appreciated from the following detailed description.

DESCRIPTION OF THE PREFERRED EMBODIMENT

Figure 1:
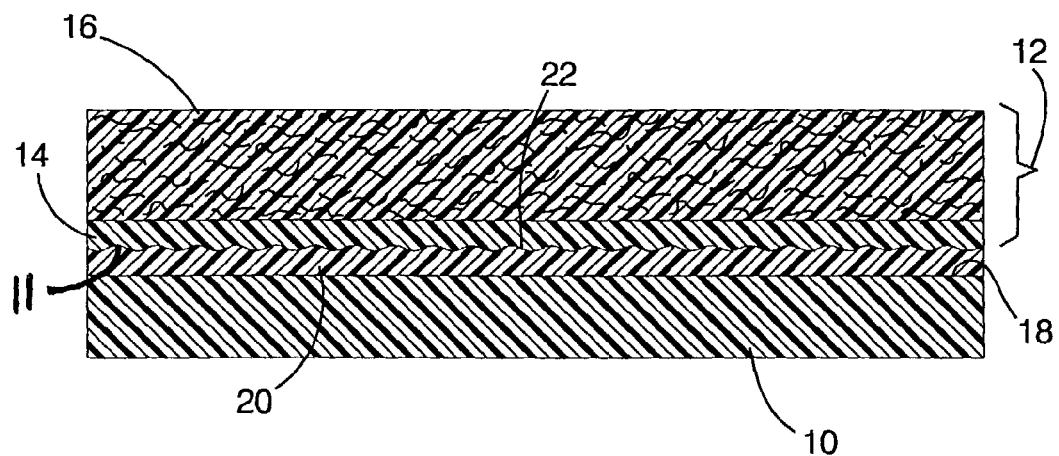
FIG. 1 represents a cross-sectional view of an open tool mold for producing a composite article with a textured surface in accordance with the present invention.
Figure 2:
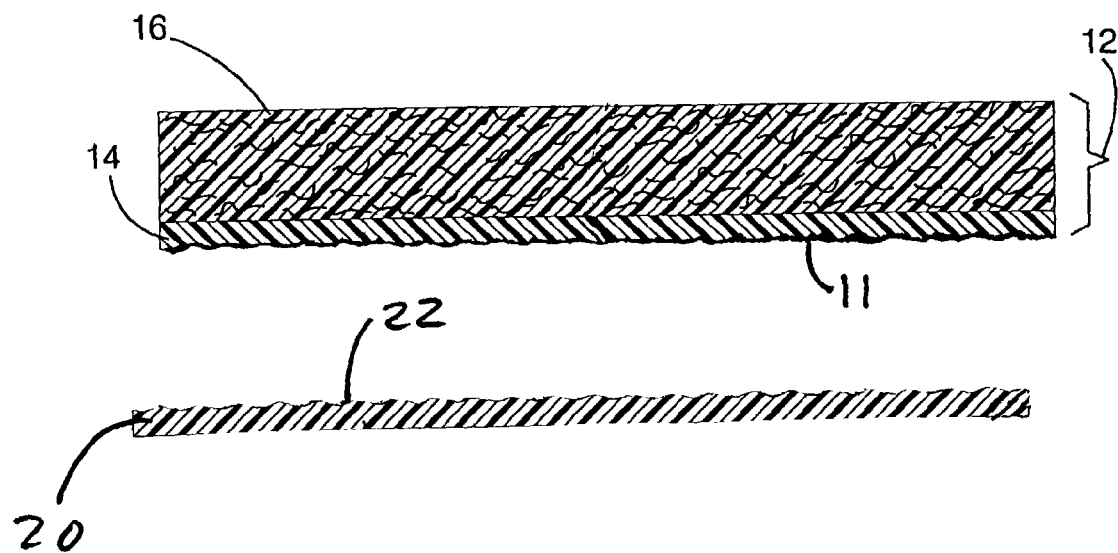
FIG. 2 represents a cross-sectional view showing the complete composite article with the film layer pulled away from the textured article surface.

Illustrated in FIG. 1 is a cross-section through a portion of an open tool mold 10 on which a composite article 12 is in the process of being cast. As is typical in the art, the article 12 is formed by depositing a gel coat layer 14, over which a fiber-reinforced laminate 16 is applied. Following complete curing in the mold 10, the gel coat layer 14 and laminate 16 form the unitary article 12 whose outer surface 11 is defined by the cured gel coat layer 14. Advantageously in accordance with the present invention, a film layer 20 having a textured film surface 22 is formed onto the mold surface 18, as described further below. As shown in FIG. 2, the cured gel coat layer 14 takes the shape of the textured film surface 22 and provides an outer textured article surface 11 of the article 12 which preferably provides a textured show surface that requires no additional processing or painting for finishing. Such a finish would be a suitable show surface for automotive interior and exterior panels, shower and bathroom applications, marine and recreational vehicle applications, etc. that may employ this process.

Various compositions can be employed for the gel coat layer 14 and laminate 16. Because the gel coat layer 14 defines the textured article surface 11 of the article 12 after molding, the materials for the gel coat layer 14 and laminate 16 must be compatible. In one embodiment that achieved particularly desirable processing and wetting properties, the laminate 16 was formed by a mixture of one-inch (about 25 mm) long glass fibers and a resin chemistry containing:

100 parts of an unsaturated polyester resin with a styrene monomer content of about 32%, available from Alpha/Owens-Coming under the name H834. The resin is a maleic anhydride-based unsaturated polyester modified with dicyclopentadiene, and contains a thixotrope and cobalt 2-ethylhexanoate as a promoter that reacts with methyl ethyl ketone peroxides (MEKP) to facilitate curing at room temperature. The resin has a specific gravity of about 1.100 g/cc and a Brookfield viscosity of about 670 cps using an RVF viscometer at 20 rpm with a #3 spindle.

0.81 parts of a wetting and dispersing additive having a specific gravity of about 1.010 g/cc and available from BYK under the name W-972.

0.23 parts of a wetting and dispersing additive having a specific gravity of about 0.930 g/cc and available from BYK under the name R-605.

0.23 parts of a silicon-free air release additive available from BYK A-555 to reduce foaming.

23 parts of a calcium carbonate ($CaCO_3$) powder with a particle size of about 5 micrometers.

1.23 parts of a fumed silica thixotrope available from Cab-O-Sil under the name TR-720; specific gravity of about 0.050 g/cc.

1.50 parts of a methyl ethyl ketone peroxide (MEKP) available from Elf Atochem NA under the name DDM-9; specific gravity of about 1.084 g/cc.

The gel coat layer 14 was a polyester-based material, and therefore chemically compatible with the laminate 16. Suitable thicknesses for the gel coat layer 14 and laminate 16 are about 0.5 mm and about 3 mm, respectively, though it is foreseeable that various thicknesses could be used. Because the outer textured surface 11 of the article 12 is defined by the cured gel coat layer 14, it is often desirable that the gel coat layer 14 contain pigmentation to produce a particular color desired for the article 12.

As shown in FIG. 1, a textured film layer 20 is positioned between the mold surface 18 and the article 12. The surface 18 of the mold 10 is preferably smooth while the exposed film surface 22 of the film layer 20 opposite the mold 10 is textured. Accordingly, the textured film surface 22 of the film layer 20 defines the molding surface to the article 12, such that the surface 18 of the mold 10 is not subject to damage and wear during the process of removing the article 12 from the mold 10. Therefore, a particular feature of this invention is that the mold 10 can be formed from materials that are far less durable and wear-resistant than steel, including polymers such as epoxies and polyesters. However, it is foreseeable that the advantages of this invention could be realized with other types of mold tooling and other mold materials.

According to the invention, the film layer 20 is made of a polymeric material having a thickness of about 1 mm to about 3 mm. While this thickness is not critical, the film layer 20 should have sufficient thickness for withstanding any handling during the vacuum forming process, yet be thin enough to conform to the shape of the mold 10. Preferably, the film layer 20 is made of a material such as nylon, or ABS.

The film layer 20 has a textured film surface 22 which has protrusions that form some type of decorative pattern, such as a leather grain texture, a logo, or any other type of desired design. The film layer 20 is made completely independent of the mold 10 and does not need to be sprayed or cured on the mold 10. Advantageously, the film layer 20 can have multiple areas of texturing or can have some smooth and some textured areas.

The steps generally entailed in producing the composite article 12 in accordance with FIG. 1 are to first clean and then optionally deposit a suitable mold release agent on the surface 18 of the mold 10. The film layer 20 is then placed onto the mold surface 18, preferably by vacuum forming onto the mold 10. While vacuum forming is not required, it is important that the film layer 20 does not have wrinkles or bumps that would disrupt the final quality of textured article surface 11. Optionally, a second layer of a suitable mold release agent may be applied to the textured film surface 22 of the film layer 20 prior to forming the gel coat layer 14 in order to facilitate later removal of the film layer 20 from the article 12. The gel coat layer 14 is then deposited over the textured film surface 22 of the film layer 20 in a suitable manner, such as spraying. As the gel coat layer 14 cures, it conforms to and takes the shape of the textured film surface 22 to create an outer textured article surface 11. The gel coat layer 14 may preferably be partially cured prior to application of the laminate 16. The film layer 20, gel coat layer 14 and laminate 16 are then fully cured before demolding, yielding the article 12 having a textured article surface 11 defined in the gel coat layer 14 and covered by the film layer 20.

The film layer 20 provides a protective coating over the outer textured article surface 11 which can be removed immediately upon demolding or which can be removed after the article 12 has reached a destination where the protective film layer 20 is no longer desired.

It will be appreciated that the film layer 20 preferably covers a substantial portion of the mold surface 18 such that a substantial portion of the article surface 11 will be textured when the curing process is complete. Advantageously, all of the article 12 can be easily textured at once using this process. However, it is contemplated that there could be cases in which the entire mold surface 18 would not be covered with the film layer 20, for instance in the case of a very large article or an article for which only localized texturing is desired.

Advantageously, by using the film layer 20 that is a preformed film prior to application to the mold 10, it will be appreciated that the article 12 could be formed with selective textured and smooth surface areas or with different textured surfaces depending on the contour of the area of the textured film surface 22 that is provided for the gel coat layer 14 to form over.

Figure 3:
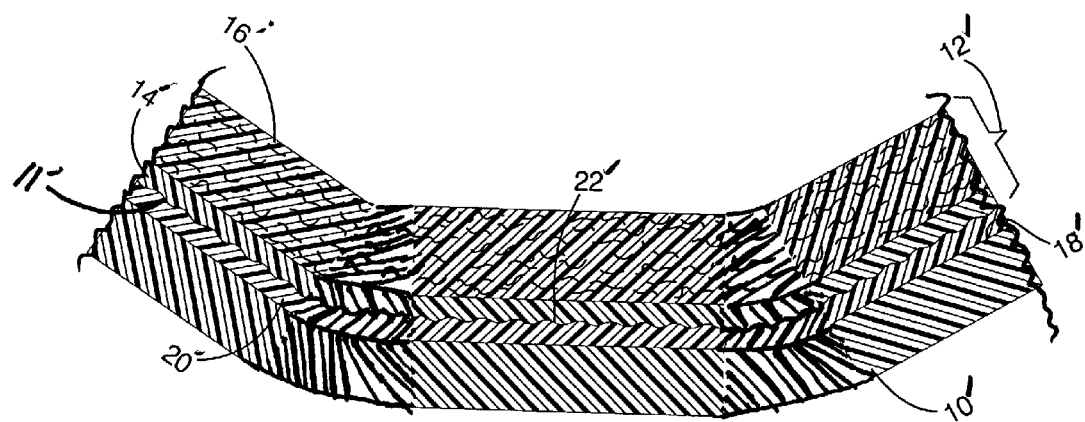
FIG. 3 represents a break-away cross-sectional view of an open tool mold for producing a composite article in accordance with an alternative embodiment of the invention in which the article is not substantially flat.

As shown in FIG. 2, the article 12 is preferably a generally planar composite article 12 such as is desirable for use as an automotive panel. However, as shown in the alternate embodiment of FIG. 3, it will be appreciated that the article 12' could also be a curved article 12' in accordance with this invention. The article 12' can take many shapes as long as the film layer 20' can be evenly formed onto the mold surface 18' without wrinkles, preferably by vacuum forming.

Figure 4:
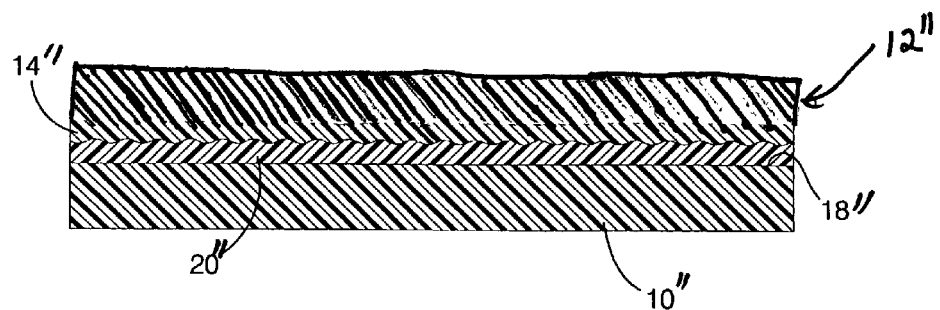
FIG. 4 shows a cross-sectional view of an open tool mold for producing a composite article in accordance with an alternate embodiment of the invention in which the composite article consists of the gel coat layer.

It will be appreciated that the composite article could have additional layers or that the gel coat layer could be the only layer that makes up the composite article. For example, FIG. 4 shows a composite article with similar reference numerals as described above having similar descriptions. However, the gel coat layer 14" is the only layer of the composite article 12". This process could be used for decorative applications that don't require the strength of the laminate and the thickened gel coat layer 14" could provide the structural strength. For example, the gel coat layer 14" could be given a thickness of about 0.5 mm to about 5 mm.

From the above, it can be seen that a significant advantage of the present invention is that a removable textured film layer can be employed as an alternative means for generating a textured finish on the surface of a composite article produced with an open tool molding process. As a result, the invention overcomes the prior requirement for using an expensive textured steel mold to produce textured composite articles. Instead, less durable mold materials can be used to form molds with untextured (i.e., smooth) mold surfaces, which are then coated with the textured interfacial layer of this invention to impart the desired textured surface to the composite articles. Also advantageously, this invention eliminates the need for spraying on and waiting to cure a separate interfacial layer to provide a textured article surface.

While certain embodiments of this invention have been described above, the invention is not intended to be limited thereby, but it is intended to be interpreted broadly within the scope and spirit of the following claims.

What is claimed is:

1. A method of producing a composite article with a textured surface, the method comprising the steps of:
   providing a mold having a mold surface;
   providing a film layer having at least one textured film surface;
   placing the film layer on the mold with the textured film surface exposed and facing away from the mold surface; and
   applying a composite material on the textured film surface such that the composite material adjacent the textured film surface substantially conforms to and takes the shape of the textured film surface to form a textured article surface;
   wherein the composite material comprises a gel coat layer and a fiber reinforced laminate, the gel coat layer being deposited on the film layer and the fiber-reinforced laminate being applied to the gel coat layer.

2. The method according to claim 1 wherein the textured film surface extends over a substantial portion of the mold and wherein the textured article surface extends over a substantial portion of the composite article.

3. The method according to claim 1 wherein the film layer is placed onto the mold by vacuum forming such that the film layer substantially conforms to the shape of the mold surface.

4. The method according to claim 1 wherein the method is an open tool molding process.

5. The method according to claim 1 wherein the gel coat layer has sufficient thickness to provide structural stability to the composite article.

6. The method according to claim 5 wherein the gel coat layer has a thickness of about 0.5 mm to about 5 mm.

7. The method according to claim 1, wherein the gel coat layer and the fiber-reinforced laminate are cured together on the mold to form the composite article in which the cured gel coat layer defines the textured article surface of the composite article.

8. The method according to claim 1 wherein the reinforcement layer has a thickness of about 3 mm.

9. The method according to claim 1 wherein the gel coat layer has a thickness of about 0.5 mm.

10. The method according to claim 1, wherein the gel coat layer contains a polymeric material and the fiber-reinforced laminate comprises a polymeric material mixed with a fibrous material.

11. The method according to claim 1, further comprising the step of partially curing the gel coat layer prior to application of the laminate.

12. The method according to claim 1, further comprising the step of removing the composite article from the mold prior to removing the textured film layer from the composite article.

13. The method according to claim 12, wherein the textured film layer is removed from the composite article after the composite article has been transported to a site remote from the mold.

14. The method according to claim 1, further comprising the steps of:
   fully curing the composite material so that the composite material forms the composite article having the textured article surface and such that the film layer is adjacent the textured article surface; and then
   removing the composite article with the film layer thereon from the mold; and then
   removing the film layer from the composite article to reveal the textured surface of the composite article.

15. The method according to claim 1 wherein the composite article is a substantially flat panel.

16. The method according to claim 1 wherein the composite article has a non-flat shape.

17. The method according to claim 1 wherein the composite article has a curved shape.

18. The method according to claim 1 wherein the composite article is one of an exterior or interior trim panel for an automobile.

19. The method according to claim 1, wherein the mold surface is defined by a polymeric material.

20. The method according to claim 1 wherein the film layer is a thermoplastic material.

21. The method according to claim 1 where the film layer is an ABS material.

22. The method according to claim 1 wherein the film layer has a thickness of about 1 mm to about 3 mm.

23. The method according to claim 1, further comprising the step of placing a mold release composition between the mold surface and the film layer.

24. The method according to claim 1, further comprising the step of placing a mold release composition between the textured film surface and the composite material.

25. An open tool molding process for producing a composite article with a textured surface, the method comprising the steps of:
   providing a mold having a mold surface;
   providing a film layer having at least one textured film surface;
   vacuum forming the film layer onto the mold such that the film layer substantially takes the shape of the mold surface with the textured film surface being exposed and facing away from the mold surface;
   applying a composite material on the textured film surface such that the composite material adjacent the textured film surface substantially conforms to and takes the shape of the textured film surface to form a textured article surface; and
   removing the composite article from the mold prior to removing the film layer from the composite article whereby the removal of the film layer reveals the textured article surface.

26. The method according to claim 25 wherein the textured film surface extends over a substantial portion of the mold and wherein the textured article surface extends over a substantial portion of the composite article.

27. The method according to claim 25 where the film layer is an ABS material.

28. The method according to claim 25 wherein the film layer has a thickness of about 1 mm to about 3 mm.

29. A composite article formed on a mold having a mold surface by the process of:
   providing a film layer having at least one textured film surface;
   vacuum forming the film layer onto the mold such that the film layer substantially takes the shape of the mold surface with the textured film surface being exposed and facing away from the mold surface;
   applying a composite material on the textured film surface such that the composite material adjacent the textured film surface substantially conforms to and takes the shape of the textured film surface to form a textured article surface as it cures; and
   removing the composite article from the mold.

* * * * *